United States Patent [19]
Wiggins et al.

[11] Patent Number: 5,463,727
[45] Date of Patent: Oct. 31, 1995

[54] WINDOW SELECTION METHOD AND SYSTEM FOR AN INTERACTIVE DISPLAY

[75] Inventors: Ralphe Wiggins, Stamford, Conn.; Elizabeth Smith, Chappaqua; Suzanne P. Shanbaum, Mt. Kisco, both of N.Y.

[73] Assignee: Advanced Systems, Inc., New York, N.Y.

[21] Appl. No.: 300,003

[22] Filed: Jan. 13, 1994

Related U.S. Application Data

[63] Continuation of Ser. No. 598,258, Oct. 16, 1990, abandoned.
[51] Int. Cl.⁶ ........................................................ G06F 3/00
[52] U.S. Cl. ........................ 395/156; 395/157; 395/159; 395/139
[58] Field of Search .................... 395/155–161, 395/12, 139; 345/117–120, 146, 131, 902; 364/419

[56] References Cited

U.S. PATENT DOCUMENTS

| | | | |
|---|---|---|---|
| 4,556,954 | 12/1985 | Advani et al. | 364/419 |
| 4,586,035 | 4/1986 | Baker et al. | 340/712 |
| 4,611,306 | 9/1986 | Crehan et al. | 395/156 |
| 4,656,603 | 4/1987 | Dunn | 340/721 X |
| 4,688,195 | 8/1987 | Thompson et al. | 395/12 |
| 4,698,624 | 10/1987 | Barker et al. | 340/709 |
| 4,701,752 | 10/1987 | Wang | 340/723 |
| 4,712,191 | 12/1987 | Penna | 395/156 |
| 4,821,211 | 4/1989 | Torres | 395/156 |
| 4,823,283 | 4/1989 | Diehm et al. | 395/156 |
| 4,899,136 | 2/1990 | Beard et al. | 395/159 |
| 5,001,697 | 3/1991 | Torres | 395/156 |
| 5,065,347 | 11/1991 | Pajak et al. | 395/159 |
| 5,079,695 | 1/1992 | Dysart et al. | 395/700 |
| 5,140,677 | 8/1992 | Fleming et al. | 395/159 |
| 5,140,678 | 8/1992 | Torres | 395/159 |
| 5,146,556 | 9/1992 | Hullot et al. | 395/159 |

OTHER PUBLICATIONS

Macintosh System Software User's Guide, V. 6.0, Apple Computer, Inc., 1988, pp. 14–43.

Primary Examiner—Mark R. Powell
Assistant Examiner—John E. Breene
Attorney, Agent, or Firm—Dennis H. Lambert

[57] ABSTRACT

A window system wherein lower level screens display a reduced size iconic representation of a menu screen. The depression of determined keys or key combinations enables the user to scan the menu in an iconic representation as well as to select the window corresponding to the position of the cursor. The reduced size iconic menu representation may be associated with descriptive text. The system permits selection of new window without the necessity of returning to the menu at the next higher window level. Icons may also be provided to enable skipping of menu levels, to avoid the necessity of returning to a previous menu.

13 Claims, 2 Drawing Sheets

WINDOW SELECTION METHOD AND SYSTEM FOR AN INTERACTIVE DISPLAY

This application is a continuation of application Ser. No. 07/598,258, filed Oct. 16, 1990, abandoned.

FIELD OF THE INVENTION

The invention relates to an interactive display method and system employing menu windows or screens in the selection of other display windows or screens.

BACKGROUND OF THE INVENTION

Many interactive software packages are structured in terms of a menu screen from which the user can choose a subsequent screen with which to interact. If the user wishes to shift to another screen among the set, he or she returns to the menu screen, with a predetermined input, selects another option, and then proceeds to interact with the new menu or program screen.

In prior systems, if the user is currently viewing one screen, and desires to go to another, it is necessary to either recall the main menu for further selection, or to enter predetermined codes into the keyboard, or other input device, that call the desired new window. In the latter case, the user must know the entry code for the new window, since there is no material on the screen that provides such information.

Prior systems include, for example, U.S. Pat. No. 4,556,954, Advani et al, which discloses a multiple disk word processing system that employs only full size menus, including a menu especially adapted to programs that have been developed on a combined program/work diskette.

U.S. Pat. No. 4,586,035, Baker et al, discloses a display system having at least one window smaller than the full screen, wherein controlling the cursor to cross determined portions of the boundary of the window effects the display of a determined menu portion adjacent the window. Normally, however, the menu portions are not displayed.

U.S. Pat. No. 4,698,624, Barker et al, and U.S. Pat. No. 4,701,752, Wang, disclose programs of the type wherein any of a number of pull down menus may be called while an image is being displayed, the selection of the menus being controlled by cursor movement. The pull down menu is not continuously displayed, and constitutes the only selection menu.

U.S. Pat. No. 4,611,306, Crehan et al, discloses a graphics program for a word processor, wherein a dedicated key is employed to toggle between a construction menu for a graphics image, and the graphics image formed thereby. The graphics image is a chart such as a bar, line or pie chart.

U.S. Pat. No. 4,656,603, Dunn, discloses a graphics program wherein graphic primitive are displayed in a given region of the screen, for selection by a user. The graphic icons do not correspond to a reduced size representation of a menu for the selection of other menus or programs.

U.S. Pat. No. 4,688,195, Thompson et al discloses a menu navigation system, wherein a menu tree is graphically displayed on the screen. The menu items are selected by the cursor, so that menu levels can be readily jumped. The system does not employ icons.

U.S. Pat. No. 4,821,211, Torres discloses a menu system for an instrument such as an oscilloscope, wherein menu items that are appropriate to a given operating condition are automatically displayed, and menu items that are not appropriate to the operating condition are either removed from the menu display, or are not displayed. No icons are employed in the system of this patent.

U.S. Pat. No. 4,823,283, Diehm et al discloses a natural language interface building system that parses inputs using an internal menu structure. This system also does not employ icons.

SUMMARY OF THE INVENTION

The invention relates to the use of iconic menus to readily enable a user to move from sibling screen to sibling screen without returning to the parent menu screen, or to skip screen levels in a simplified manner.

Briefly stated, in accordance with the invention, an icon is displayed on one or more lower level screens, in the form of a reduced size representation or outline of a menu screen of a higher level. When a user wishes to shift to another screen, he or she can move a selector, such as a cursor, around in the icon in a manner similar to moving the selector on the menu screen (via arrow keys, tab key, mouse, etc.). The menu icon includes representations of the menu items of the main menu, for example in iconic form (e.g. with rectangular areas arranged in the format of the main menu). Text may be provided in the reduced size menu representation, for example in or associated with the iconic formatted menu items, to further delineate the options that the user can select. With this system, instead of requiring the user to return to the menu screen, as in known arrangements, the user can easily control the system to pass directly to the selected new screen.

In another feature in accordance with the invention, a further icon, such as but not limited to an UP arrow, may be included in the reduced size menu representation to provide a selection choice for the user to skip over the next higher level menu, to return to a grandparent menu.

In accordance with the invention, a menu of a given level is displayed on the screen, for example a main menu, providing text identifying each window that can be called. This menu also preferably identifies the selection choices by icons such as, for example, rectangles of a selected aspect ratio. After the user has selected and entered a desired window from the main menu, by conventional means, a new screen is displayed corresponding to the selection that has been made. This new screen includes a reduced size iconic representation of the main menu, including the iconic selection choices preferably arranged in the manner that they were arranged in the main menu. The iconic selection choices may be provided with associated identifying text, but such text may be omitted if desired. It is preferable, however, that text be displayed in the iconic menu that identifies each selection icon at the time that it is being scanned, for example by a cursor. In order to go to another window without returning to the main menu, the user uses the cursor arrow keys (for example, along with a control key) to effect the scanning of the selection icons in the iconic menu portion of the screen. When the icon corresponding to the next desired window is selected by the cursor, the user can easily go directly to such next desired window, with a simple keystroke or keystrokes.

In modifications of the invention, icons can be displayed in the reduced size iconic menus that correspond to menus other than the main menu at the next higher window level, to enable the user to easily jump to different levels of menus of either higher or lower degree, so that menu levels can be skipped, if desired. The icons themselves can be of any desired shape, and can have identifying characters in them.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
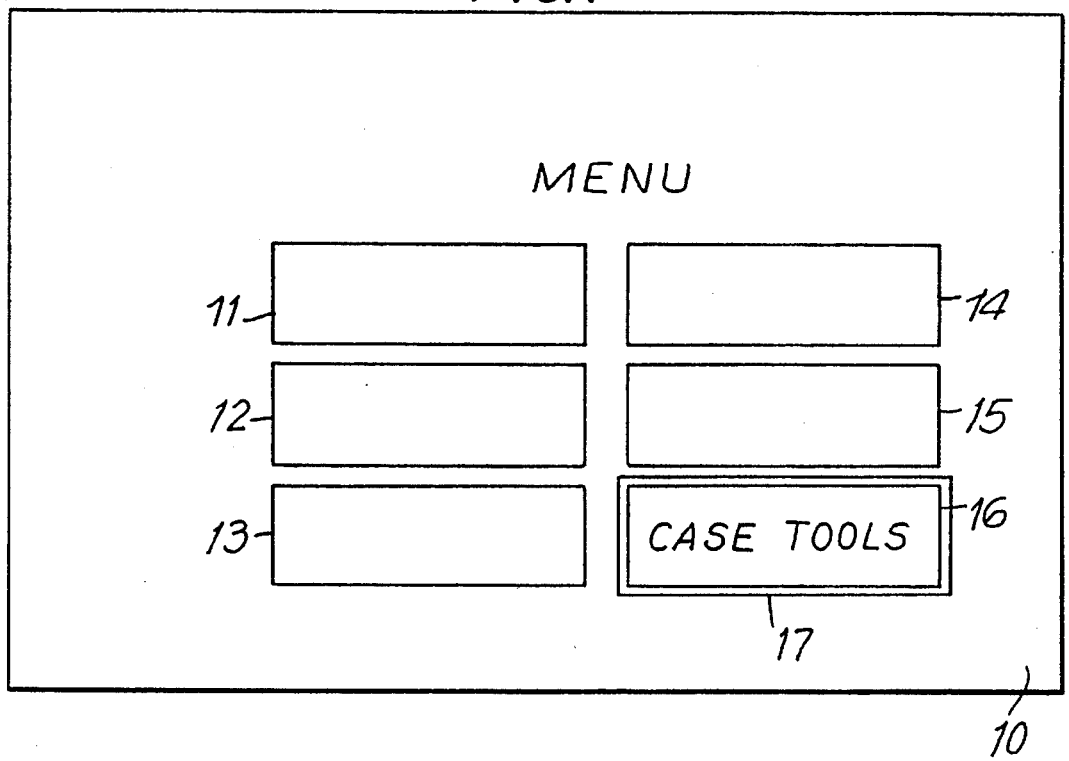
FIG. 1 is an illustration of a menu window in accordance with the invention.

Referring now to the drawings, and more in particular to FIG. 1, therein is illustrated a menu display screen 10 that may be employed as a window in the system and apparatus in accordance with the invention. The screen includes a display of a plurality of menu choices, in the form of rectangular icons 11–16. These menu choices may be selected, in a computer system, in conventional manner, for example by moving a cursor to a selected icon, under control of a keyboard, mouse, etc. Rectangular icon 16 is illustrated in FIG. 1 has having been selected, by the rectangular outline 17. It is of course apparent that the appearance of an icon, when it is selected, is a matter of choice. For example only, selection of an icon may be indicated by an increase in the brightness level of the icon, by the appearance of a cursor on the icon, or by drawing a band around the icon, etc.

It is of course advantageous that the menu choices be provided with text, in order to assist the user in selecting the menu items. As illustrated in FIG. 1, only the selected menu choice is provided with text. It is preferable, however, that a main menu, as illustrated in FIG. 1, include identifying text for each menu selection.

In accordance with the invention, the icons that are provided in the menu may have any other desired shape, size, arrangement or other visible characteristic. While it is preferred that the menu screens are iconic, i.e. include displays of icons, the selections may alternatively be marked only by text.

The menu choices in the iconic menu correspond to different windows that may be selected by a user, the different windows corresponding, for example, to different submenus, data screens or processing screens, in the manner of conventional menu selection arrangements.

Figure 2:
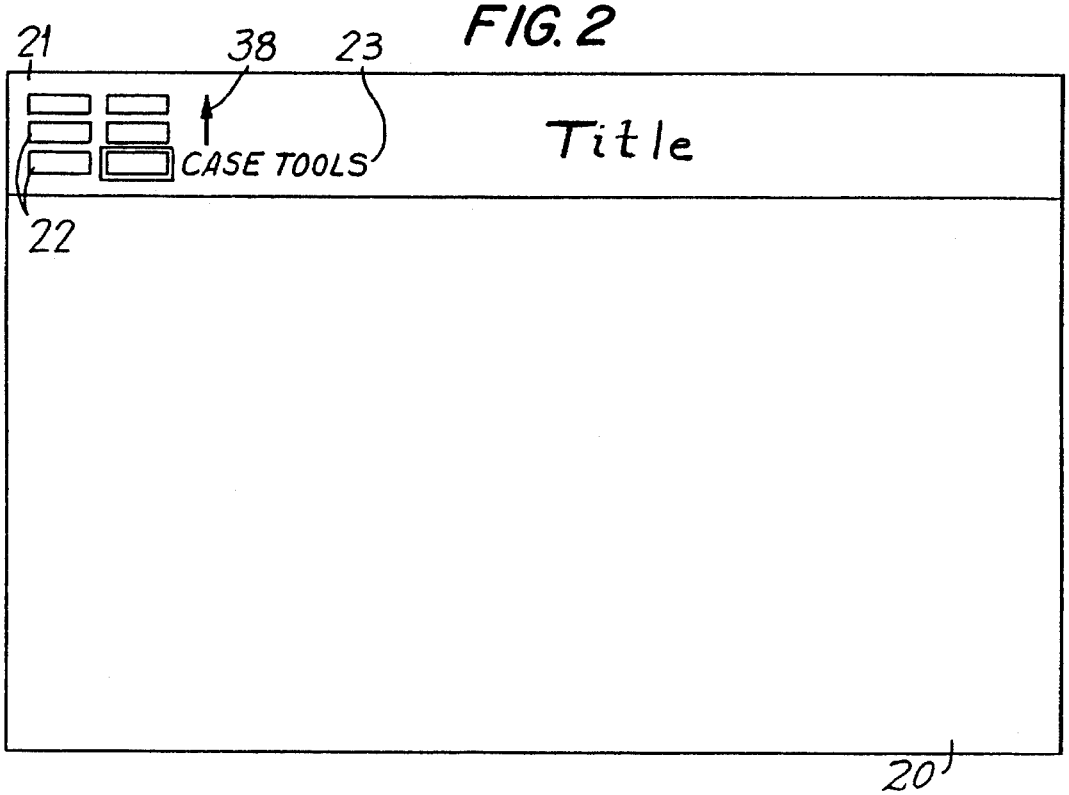
FIG. 2 is an illustration of a lower level window with a reduced size iconic representation of a menu window, in accordance with the invention.

Assuming that the user selects the window corresponding to icon 16 of FIG. 1, for example by moving a cursor to the icon and depressing the return key on the keyboard or a button on a mouse, the window 20 corresponding to this selection will be displayed, as illustrated in FIG. 2. (The window 20 is illustrated as blank since its actual contents are immaterial to the invention, and hence it may contain any desired text, instructions, graphics, etc.) In addition to the selected window 20, the screen also displays an iconic representation 21 of the menu of the next higher level window, e.g. the menu of FIG. 1. This iconic representation 21 is of a substantially smaller size than it appears in the higher level window, and may be located in a part of the screen of FIG. 2. As in the case of the menu of FIG. 1, the iconic representation of the menu in FIG. 2 has similarly shaped, but smaller, icons 22. The icons 22 are preferably arranged in the same manner as the icons 11–16, in order to facilitate their selection by the user.

The icons in the iconic representation 21 can be selected in the same manner as they are in the main menu, e.g. by moving a cursor into the iconic representation 21 and thence to the icon corresponding to the next window that it is desired to display. If desired, the movement of the cursor into the iconic representation area may require the depression of a control key or the like, in order to avoid inadvertent movement of the cursor into this area of the screen.

It is also preferable to associate identifying text 23 with the icons in the iconic representation 21. For example such identifying text may be controlled to appear only when the corresponding icon 22 has been selected.

Upon selection of an icon 22, followed, for example, by depression of a return key or a mouse button, the program effects the display of the window (not shown) corresponding to the newly selected icon.

Figure 3:
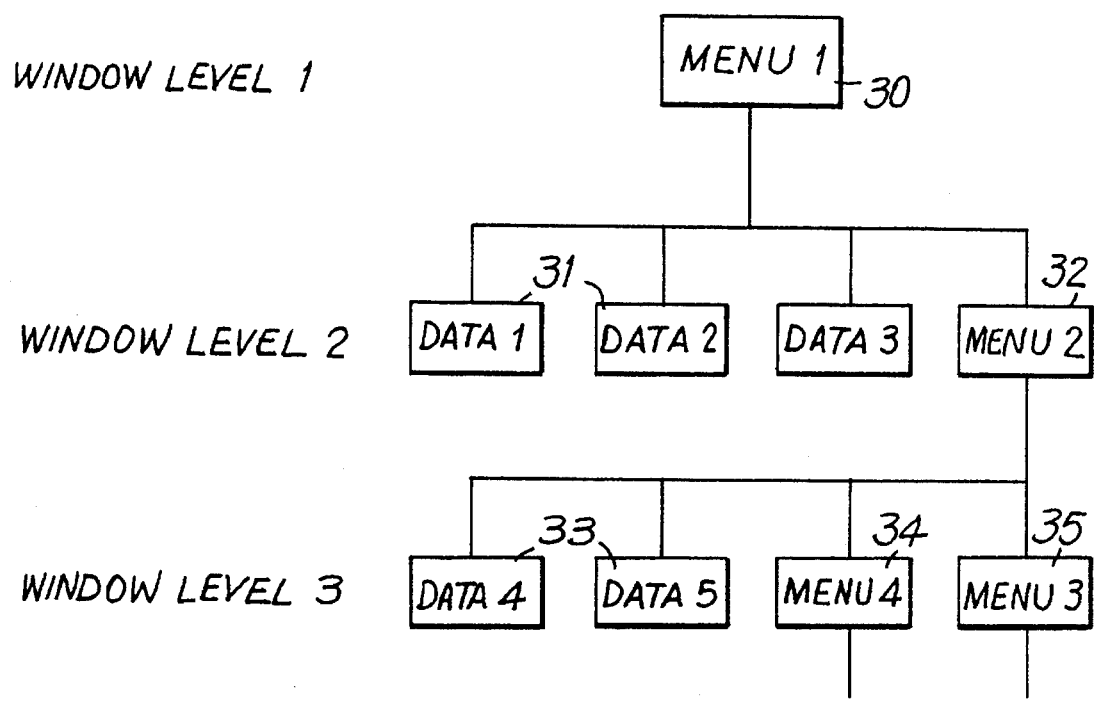
FIG. 3 is an illustration of a hypothetical menu tree.

FIG. 3 illustrates a hypothetical menu tree having three window levels, wherein a menu window 30 in the highest window level enables selection of windows 31 and a menu window 32 at the next lowest window level, and the menu window 32 enables selection of windows 33 and menu windows 34, 35 at a still lower window level. If, for example, a window 33 is currently being displayed, and the user wishes to return to the menu window 30 at the highest level, it is normally required that the user depress the required keys to first return to the second level menu window 32, and then press the required keys to return to the higher level menu window 30.

In accordance with the invention, window levels may be skipped by the provision of an additional icon 38, for example an UP arrow, in the iconic representations 21, as illustrated in FIG. 2. The selection of this icon, for example by movement of the cursor to it, directs the program to return directly to the menu window 30, thereby skipping the intermediate window level. It is apparent that other icons may also or alternatively be provided in the iconic representations in order to enable the selection of windows from any desired window level.

Figure 4:
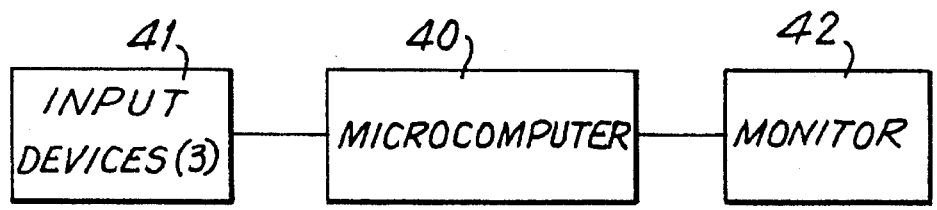
FIG. 4 is a simplified block diagram of a hardware arrangement that may incorporate the invention.

The system of the invention may be comprised of conventional hardware, as illustrated in FIG. 4, including a microcomputer 40, one or more I/O devices 41, such as a keyboard, mouse, etc., and a monitor 42. The microcomputer includes programs, for example in ROM, for performing the method of the invention.

The program in accordance with the invention is adapted to display the windows, as above discussed, and to permit the system to respond to the selected inputs, employing conventional programming techniques. The invention is hence directed to the use of such conventional programming techniques to provide screen displays in accordance with the above disclosure, and to direct the system to call the various windows in the above described manner.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a computer system, an interactive window display and selection method for directly accessing information contained in different windows or window levels, comprising the steps of:

displaying in a first window on a display screen a menu of items representative of a corresponding number of data sets;

selecting one of the menu items in the first window by using a computer control means such as a keyboard or mouse to open on the display screen a new, second window containing the data set represented by the selected menu item; and upon opening of said second window by selection of said menu item, simultaneously reducing the scale of the non-selected menu items and displaying them on another part of the screen, whereby one of the non-selected menu items may be directly accessed and selected to open a new, third window and display it on the screen without first having to exit the second window and move through different levels to access information contained in a different heirarchy or a different level of a heirarchy than that previously selected.

2. An interactive window display and selection method as claimed in claim 1, wherein:

the non-selected menu items are displayed in iconic form on the new screen.

3. An interactive window display and selection method as claimed in claim 2, wherein:

a title bar is displayed in the second window; and the non-selected menu items are displayed in the title bar.

4. An interactive window display and selection method as claimed in claim 3, wherein:

the non-selected menu items include an icon which may be selected to skip over an intervening window level to access and open a window that is at least two levels removed from the window that is then open.

5. An interactive window display and selection method as claimed in claim 1, wherein:

a title bar is displayed in the second window; and the non-selected menu items are displayed in the title bar.

6. An interactive window display and selection method as claimed in claim 1, wherein:

the non-selected menu items include an icon which may be selected to skip over an intervening window level to access and open a window that is at least one level removed from the window that is then open.

7. An interactive window display and selection method as claimed in claim 1, wherein:

the menu items are displayed as icons in the first window and the non-selected menu items are displayed as an icon in the second window on the new screen.

8. An interactive window display and selection method as claimed in claim 7, wherein:

the second window includes a title bar; and the icon for the non-selected menu items is displayed in the title bar of the second window.

9. In a computer system, an interactive window display and selection method for directly accessing information contained in different windows or window levels, comprising the steps of:

displaying a main menu of menu items on a menu screen;

selecting one of the menu items by using computer control means such as a keyboard or mouse and opening a new, lower level screen containing information represented by the selected menu item; and simultaneously with opening of said new, lower level screen, reducing the size of the main menu and displaying it as an icon on the new screen, so that a user may shift to another screen by selecting an item in the main menu icon, whereby the user can open a new screen directly from said new, lower level screen without returning to the main menu screen.

10. An interactive window display and selection method as claimed in claim 9, wherein:

a further icon is displayed on the new, lower level screen, and which may be selected to enable a user to skip over the next higher level menu to directly access a grandparent menu.

11. An interactive window display and selection method as claimed in claim 10, wherein:

said main menu is displayed in a first window and selection of said menu item opens a new, second window;

said second window has a title bar; and said reduced-size menu icon of the non-selected menu items is displayed in the title bar.

12. In a computer control system having a computer control means and a display screen, a method of displaying and selecting windows on the display screen for directly accessing data contained in different heirarchies or different levels of the same heirarchy by using iconic menus to move directly from sibling window to sibling window without returning to a parent menu screen, or to skip screen levels, comprising the steps of:

displaying in a first window on a menu screen a main menu containing one or more menu items representative of different sets of data;

using computer control means such as a mouse or keyboard to select one of the menu items in said first window and to open a new, second window on a new screen; and simultaneously with the opening of said second window, reducing the size of the unselected main menu items and displaying them as a menu icon on the new screen, whereby a user may use the computer control means to select a different menu item in the menu icon for moving directly between sibling windows or between a sibling window and a parent window without having to first exit a window and move through different window levels to access data sets contained in different heirarchies or different levels of the same heirarchy.

13. An interactive window display and selection method as claimed in claim 12, wherein:

said second window contains at least one other icon representative of a different data set.

* * * * *